United States Patent [19]

Amar

[11] Patent Number: 5,319,621
[45] Date of Patent: Jun. 7, 1994

[54] DEVICE FOR STORING AND READING FLAT DATA MEDIA

[76] Inventor: Roger Amar, 23 rue Pierre Brossolette, 78350 Juoy-en-Josas, France

[21] Appl. No.: 833,072

[22] Filed: Feb. 10, 1992

[30] Foreign Application Priority Data

Feb. 12, 1991 [FR] France .................. 91 01599

[51] Int. Cl.⁵ .............................................. G11B 17/10
[52] U.S. Cl. ........................................ 369/34; 369/36; 360/98.06
[58] Field of Search ............... 369/34, 35, 36, 38, 369/39; 360/98.01, 98.04, 98.05, 98.06, 98.08

[56] References Cited

U.S. PATENT DOCUMENTS

| | | | |
|---|---|---|---|
| 2,463,050 | 3/1949 | Pasternack | 340/332 |
| 2,631,856 | 3/1953 | Osborne | 369/34 |
| 2,644,565 | 7/1953 | Ebert | 369/34 |
| 2,719,720 | 10/1955 | Rockola | 369/39 |
| 2,725,235 | 11/1955 | Hull et al. | 369/39 |
| 4,670,866 | 6/1987 | Hasegawa et al. | 369/36 |
| 4,730,292 | 3/1988 | Hasegawa et al. | 369/36 |
| 4,734,814 | 3/1988 | Fujino et al. | 360/98.05 |
| 4,945,429 | 7/1990 | Munro et al. | 369/34 |
| 5,025,340 | 6/1991 | Peters | 369/270 |
| 5,101,387 | 3/1992 | Wanger et al. | 369/34 |
| 5,138,591 | 8/1992 | Ogawa et al. | 369/34 |

FOREIGN PATENT DOCUMENTS 60-256959 12/1985 Japan .
2143942 6/1990 Japan .
2130751 8/1990 Japan .

*Primary Examiner*—Stuart S. Levy
*Assistant Examiner*—Paul J. Ditmyer
*Attorney, Agent, or Firm*—Spensley Horn Jubas & Lubitz

[57] ABSTRACT

A device for storing and reading data media such as disks read by laser beam comprises at least one column of storage platters mobile in their own planes, a transfer system mounted to move parallel to the column and at least one player provided with a drawer adapted to be placed facing a predetermined position of the transfer system. The device preferably comprises a plurality of columns of storage platters mounted on a rotatable assembly.

20 Claims, 3 Drawing Sheets

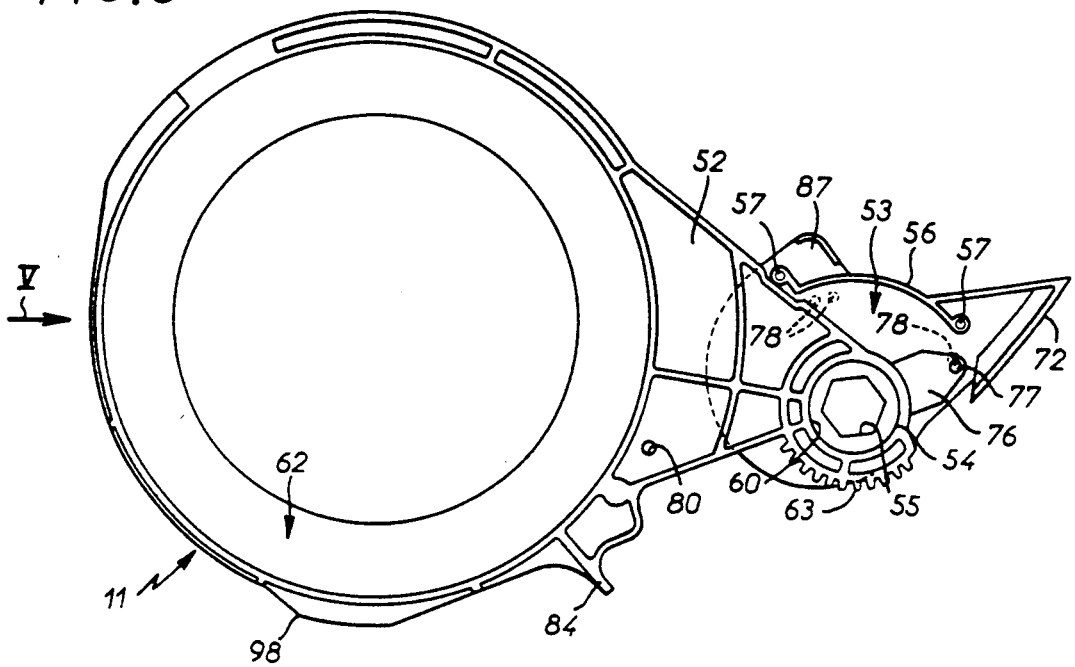
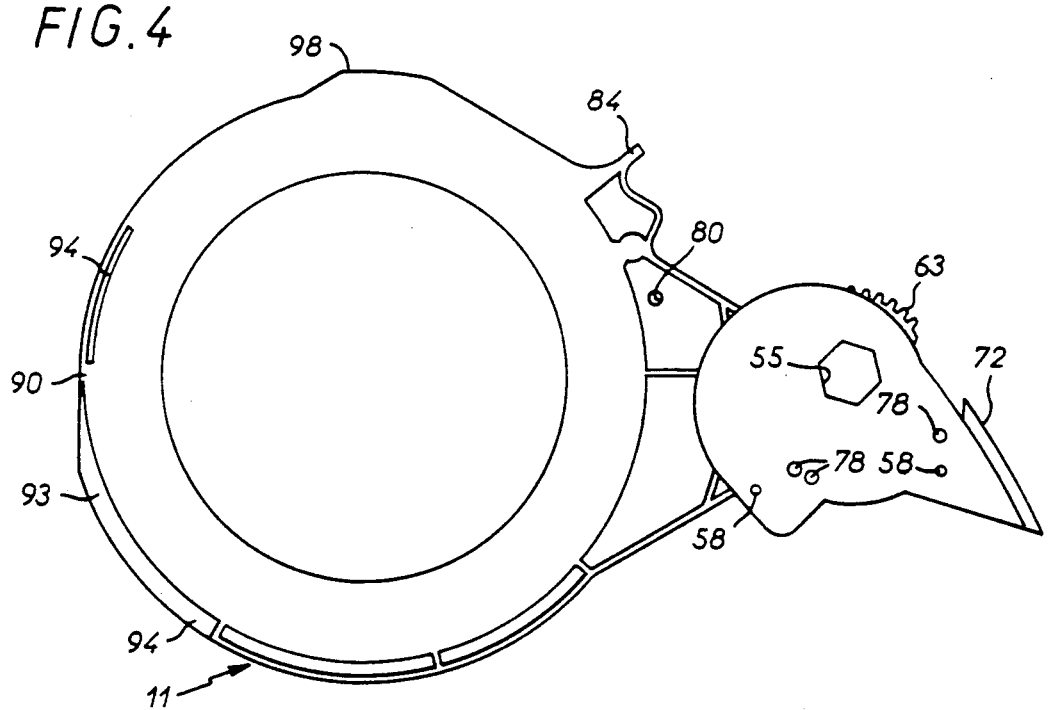
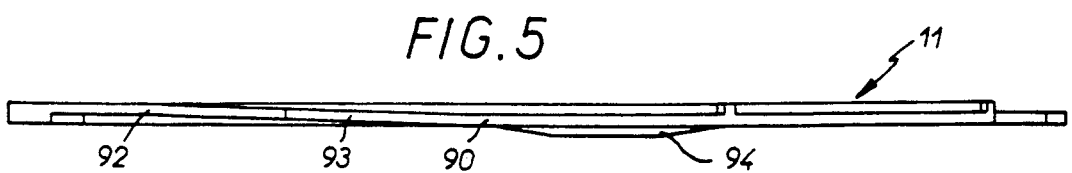

DEVICE FOR STORING AND READING FLAT DATA MEDIA

BACKGROUND OF THE INVENTION

1. Field of the Invention

The invention concerns a device for storing and reading flat data media such as disks read by a laser beam, for example; it is more particularly concerned with a device of this kind in which a large number of such data media can be stored under optimum conditions whilst providing fast access to any one of them.

2. Description of the Prior Art

In just a few years compact disks read by a laser beam have largely supplanted vinyl disks. Entire record collections have been quickly replaced by private individuals and by radio and TV studios, such are the numerous advantages of this data medium. However, managing a large number of these disks is not so simple because of their compact size. The information printed on the case of a compact disk is necessarily printed in very small type and, failing a strictly alphabetical filing system, it is by no means uncommon to have to spend some time looking for a particular title among all the disks disposed side by side on a shelf. Any filing error requires a time consuming and fiddly search to locate the misfiled disk.

To provide for a relatively long playing time, for example for listening to a work recorded on more than one disk, some player manufacturers offer systems which can automatically change a limited number of disks. A cartridge capable of holding several disks can be filled by the user who is provided with appropriate programming means for playing the disks in given order. This system makes it necessary to manipulate the disks, however. They must be taken out of their case, inserted into the cartridge and then, once they have been listened to, they must be manually removed from the cartridge, put away one by one in their case and the latter put away in turn. All these operations are time consuming, fiddly and prone to error.

The invention proposes a different concept enabling all the data media (typically disks) to be stored so that they are available to the user in a common and compact cabinet in which they are stored under optimum conditions and protected from mishandling and also enabling this storage system to have integrated into it means for automatically manipulating the data media to move them between their respective storage location and one or more data media playback devices.

SUMMARY OF THE INVENTION

The invention consists in a device for storing and reading flat data media such as disks read by a laser beam, for example, comprising in combination:

- at least one column of storage platters for said information media stacked one on the other and mounted to be mobile in their respective planes;
- a transfer system mounted to be mobile parallel to said column and comprising means for handling a data medium;
- means for selecting a data medium adapted to move the relevant storage platter into a position facing the handling means; and
- at least one player of which a loading part such as a drawer, for example, is adapted to be placed facing a predetermined position of said transfer system to receive a data medium.

The column, or each column when there is more than one column of platters, is associated with a a support column of said storage platters forming spacer means. Each storage platter is provided with a flat arm articulated to said support column. In one particularly advantageous embodiment of the invention the support column is formed by a rigid stack of members forming identical spacers each comprising a cylindrical pivot shaft section. Each flat arm of a platter has a matching hole by means of which it is mounted to rotate about said shaft section.

The invention encompasses any device as defined hereinabove comprising at least one column of storage platters. However, in an advantageous embodiment of the invention the device is provided with a plurality of columns of storage platters on a rotatable assembly which rotates about a central shaft parallel to said columns. Drive means are coupled to said rotatable assembly to displace one or other of the columns to a predetermined location at which it is able to cooperate with the transfer system.

As will be explained later, the storage system can be optimized to the point where it comprises stacks of only two different types of part molded from plastics material, respectively the storage platters and the component parts of the support column, or each support column when there is more than one support column.

Although the embodiment presently under discussion and to be described in detail hereinafter is designed for laser disks, the same principle may be applied to the fast access storage of any other type of flat data medium. To give an example, it is feasible that in the near future entirely semiconductor solid state mass memories will be available in the form of flat "wafers". Certain points on the surface of a data medium of this kind will incorporate contacts designed to be connected to an appropriate read connector. A system as defined hereinabove may therefore be ideally suited to the storage and automatic manipulation of such data media. All that is required is to replace the disk player with a solid state reader appropriate to the particular type of store.

. To eliminate the wasted time involved in changing the data medium all that is required is to provide two players which are disposed, for example, one under the other so that the programmed management system can load one of the players while the other is operating. For applications such as distributing programs to a set of individual booths or headsets (equipping a cultural or leisure center or a record shop) it is possible to provide a greater number of players, each player being connected to an individual listening booth or headset.

The invention will be better understood and other advantages of the invention will emerge more clearly from the following description of one embodiment of a device in accordance with the invention for storing and playing disks, given by way of example only with reference to the appended drawings.

BRIEF DESCRIPTION OF THE DRAWINGS

FIG. 3 is a detail view showing the cooperation of a storage platter with a spacer member of a support column.

FIG. 4 is a view of the components shown in FIG. 3 as seen from below.

FIG. 5 is an enlarged view of the storage platter as seen in profile and in the direction of the arrow V in FIG. 3.

DETAILED DESCRIPTION OF THE INVENTION

Figure 1:
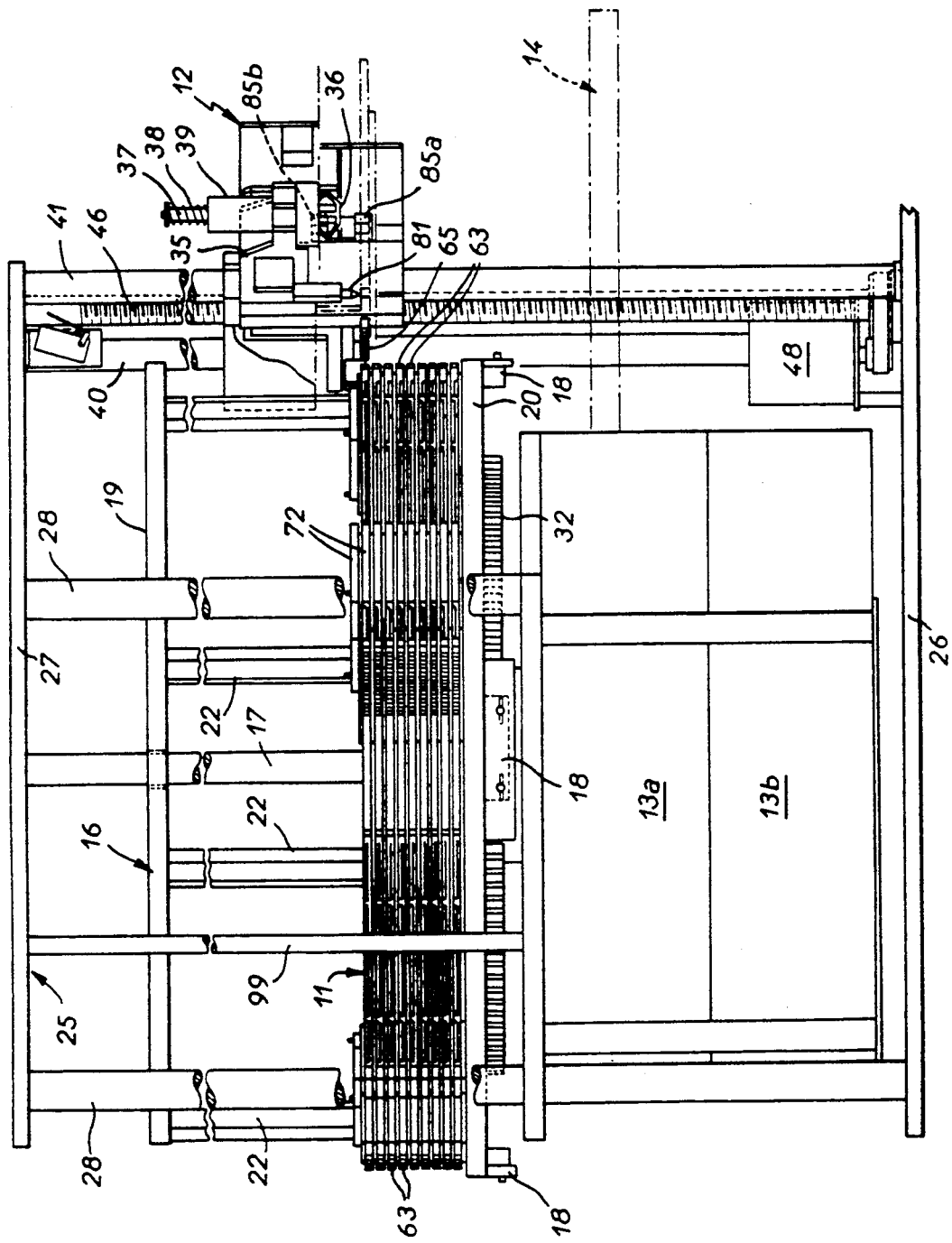
FIG. 1 is a partial schematic view in elevation of the device.
Figure 2:
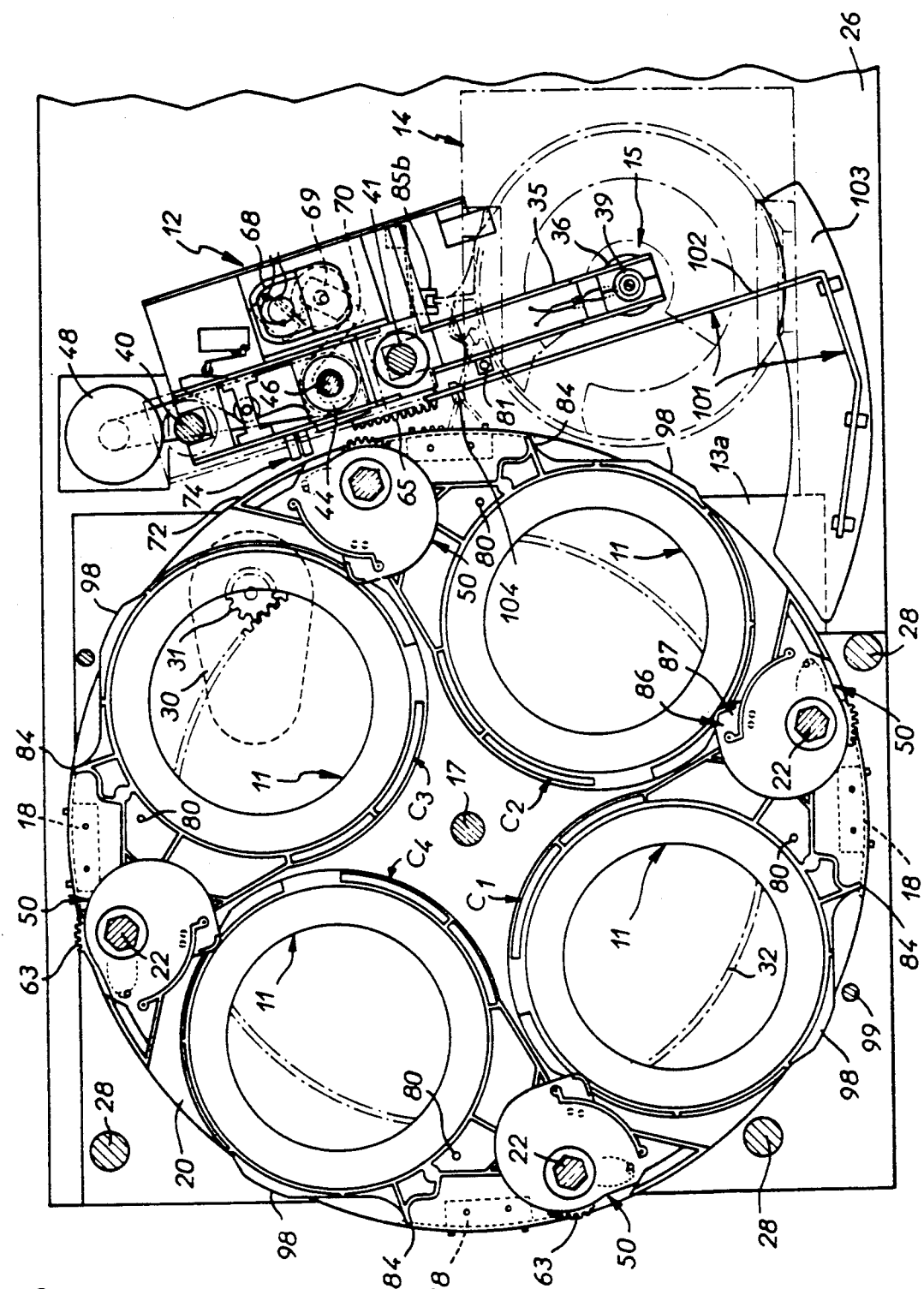
FIG. 2 is a top view of the device.

The device shown for storing and playing disks essentially comprises four vertical columns C1, C2, C3, C4 of storage platters 11 adapted to receive the disks, a transfer system 12 for manipulating the disks, means for selecting a chosen disk whose main components will be described later and at least one disk player 13, in this example installed below the columns of storage platters. The loader part of the player is in the form of a conventional drawer 14 and the player is positioned so that said drawer can take up a temporary position facing the transfer system 12. The latter comprises disk handling means 15 which are controlled so that said transfer system can pick up a disk on a storage platter 11 extracted from its column and put it down on the platter of the player 13 at a predetermined position. If a plurality of players 13a, 13b are provided, as shown, they are placed one under the other so that the drawers can be placed selectively under the transfer system to receive a disk. A manual loading drawer (not shown) is also provided in such way that it can be moved into a position facing the path of the transfer system. It may be provided near the players or preferably above the columns C1-C4 of storage platters. By virtue of this drawer the transfer system can be used to insert a new disk into the storage system and place it on a storage platter or to remove a disk from the system in order to remove it from the collection. All the parts described above are mounted inside a chassis 25 formed by a bottom plate 26 constituting a kind of base, a top plate 27 and vertical columns 28 joining the two plates. This chassis is enclosed within a casing (not shown) preventing handling of the disks and protecting them relatively well against dust, variations in temperature and humidity, etc.

In the embodiment shown, each column comprises one hundred storage platters. The device can therefore accommodate four hundred disks each of which is individually accessible in a very short time, in the order of a few seconds. Of course, there is nothing to prevent an increase in the height of each column to produce greater capacity storage systems. All that is required is for the travel of the transfer system 12 to be increased commensurately. For very large disk collections there is nothing to prevent a plurality of devices being coupled together and associated with a common management and control data processing system.

The invention encompasses any device incorporating at least one such column of storage platters. In this case the column is fixed and disposed alongside the vertical path of movement of the transfer system 12.

In the example shown in which there are four columns C1-C4, the latter are arranged on a rotatable assembly 16 which is rotated about a vertical central shaft 17 which is therefore parallel to the columns C1-C4 themselves. The rotatable assembly is adapted to move any column into a position enabling it to cooperate with the transfer system. A column is selected by means of an opto-electronic cell or the like (not shown) responsive to reflectors 18 fastened to the rotatable assembly. The latter comprises two large horizontal circular plates 19, 20 joined together by four hexagonal cross-section metal rods 22 which are equi-angularly spaced in the circumferential direction. The drive means of this rotatable assembly comprise an electric motor 30 whose output shaft is coupled by a gear 31 to a toothed ring 32 fixed to the bottom of the plate 20. For less noisy operation this system may be replaced with a belt transmission requiring a groove on the edge of the plate 18 or 19 to receive a belt driven by the motor. The motor 30 which rotates the columns of platters is controlled by a set of position sensing means, in particular the sensor cooperating with the reflectors 18 and others to be described later.

The transfer system 12 comprises an arm 35 at the end of which is a deformable core 36 which in this example is made from an elastomer material. The core is fastened to a rod 37 urged upwards by a spring 38. This rod passes through a solenoid coil 39. If the coil is not energized the core 36 is deformed radially as shown in FIG. 1 due to the action of the spring. On the other hand, when the coil is energized the rod 37 is moved downwards which deforms the core into a substantially cylindrical shape whose diameter is such that it can be inserted into the central hole of a disk. The transfer system 12 slides between two vertical rods 40, 41 extending between the plates 26, 27 of the chassis. It further comprises a threaded nut 44 immobilized against rotation engaging with a vertical threaded rod 46 rotated at the lower end by an electric motor 48 via a notched belt transmission system. This conventional arrangement moves said transfer system 12 vertically. Said transfer system comprises various other equipments, including opto-electronic sensors producing all the control signals which control the various movements. These equipments will be described in more detail later.

The structure of a column C1-C4 and of the storage platters constituting it will now be described. As previously mentioned, the platters 11 of the same column are stacked one on the other and are mounted to move in their own plane so that any platter can be extracted laterally from its own column and placed in a position enabling the transfer system to take a disk from it or put a disk on it. In this example, the platters are mounted to pivot horizontally. To this end a support column 50 of said storage platters is arranged parallel to each column C1-C4, that is to say vertically, in this example around a hexagonal cross-section rod 22. The support column fixed to the rotatable assembly 16 is segmented vertically to form spacer means adapted to maintain a small constant vertical gap between the storage platters. Each platter is provided with a flat arm 52 articulated to the respective support column 50. A support column is therefore made up of a rigid stack on the corresponding rod 22 of identical spacer members 53. Each of these members 53 incorporates a section of pivot shaft 54 whose center is formed with a hexagonal hole 55 whose dimensions match those of the rod 22. The spacing distance is determined by the axial length of the sections 54 which are stacked one on the other and by ribs 56 provided with pegs 57 at their ends. The latter are engaged in holes 58 on the lower surface of the adjacent member. Additionally, each arm 52 of a storage platter comprises a cylindrical hole 60 whose diameter matches that of the shaft section 54. The arm 52 and consequently the platter 11 are mounted to pivot about said shaft section 54.

Each storage platter 11 further comprises an annular part with a recess 62 on its upper surface adapted to receive a disk. A toothed sector 63 coaxial with the hole 60 is defined at the end of each arm. It is part of the aforementioned selector means because it is the interengagement of a toothed sector of this kind with retractable other meshing means 65 carried by the transfer system 12 which enables the relevant storage platter 11 to be selected and pivoted until it is facing the arm 35 to take a disk from it or put a disk on it. In this example, the meshing means 65 is in the form of a rack. It is mounted to pivot towards the column of storage platters that is nearest to it and is actuated by an electric motor 68 which is strongly geared down by a cam 69 and a lever 70 coupled to the rack. This manner of controlling the rack is preferable to the use of an electromagnet, for example, which operates too sharply.

The selector means further comprise a set of identifying ribs 72 of the rigid stack of spacer members 53 constituting each support column 50. Each spacer therefore carries an identifying rib of this kind on its edge. The combination of these ribs therefore makes it possible to count-down vertically the platters of a given column. This is achieved by first sensing means 74 which are opto-electronic sensor means in this embodiment, comprising a pair of cells carried by the transfer system 12. These sensing means control a control system of the motor 48 vertically positioning the transfer system 12 relative to the storage platter of the selected disk in order to cause pivoting of this platter by cooperation of its toothed sector 53 with the retractable rack 65.

To position it correctly in the storage position and in the position for cooperation with the handling means 15, each storage platter comprises a leaf spring 76 inserted into the gap between two spacer members 53. This leaf spring has a peg 77 at its end. This peg cooperates with conical bosses 78 carried by one of the two spacer members between which the leaf spring is inserted. This arrangement provides for relative stabilization of the extreme positions of the storage platter. Furthermore, each platter comprises a positioning hole 80 adapted to cooperate with a preferably conical tipped spindle 81 carried by the transfer system. When the latter is lowered to grasp a disk the spindle enters the hole 80 and, if necessary, repositions the storage platter to guarantee perfect alignment of the core 36 and the hole in the disk. This limited vertical movement of the transfer system for grasping a disk is monitored by the relative displacement between a finger 84 of the selected storage platter and opto-electrical second sensing means 85a, 85b carried by the transfer system. Each plate 11 therefore comprises a finger 84 which projects horizontally outwards into the sensing space of a U-shape cell 85a or 85b. The two cells are spaced vertically by a predetermined distance. As will be seen later, this distance represents the vertical movement of the handling means necessary to grasp a disk and to remove it from its storage platter.

As emerges clearly from the drawings, the storage platters are as thin as possible so that a large number of disks can be stored in a column of given height. It is therefore preferable for said platters to have at least two opposed bearing points in the storage position. One of these bearing points is naturally the articulation whereby the arm of the platter is attached to the support column 50.

In the case of a single column of platters at least one other support column 86 parallel to the column of platters, in other words vertical, may be provided comprising separators 87 between which respective storage platters are inserted to be held in the storage position. In the example shown in which four columns of platters are equi-angularly arranged in the circumferential direction on the rotatable assembly 16 it is advantageous, however, to combine the support columns 50 and 86 so that a support column 50 to which the platters 11 of a common column of platters are articulated is arranged to constitute also the support column 86 of the neighboring column of platters.

In the example, this is achieved by modifying each spacer member 53. In addition to its pivot shaft section 54 to which a platter is articulated each such member further comprises a protuberance constituting one of the separators 87 of the support column 86.

For correct operation it is essential for a platter 11 to be able in all circumstances to re-enter the particular housing which is defined for it between two adjoining separators 87 at the end of a maneuver. The platters 11 comprise to this end various structural features which enhance the reliability of operation, even if a platter is slightly deformed as the result of severe conditions of operation of the device.

Thus, considering the bearing area 90 at the edge of the platter which normally rests in its housing (on the lower separator) of the support column 86, note that adjoining this area and towards the interior of the storage area the edge of the platter comprises a thin rib comprising a horizontal section 92 extended by a downwardly inclined section in the form of a helix 93 terminating in the immediate vicinity of the bearing area 90. Moreover, on the other side of this bearing area (in the circumferential direction) the edge of the platter is provided with a thickened rib 94. Experiments have shown that these particular structural features increase the reliability of the device and in particular the secure return movement of the platter into the correct position in its column.

Moreover, the rotation movement of the rotatable assembly 16 is exploited to realign the platters in their respective columns if necessary. To achieve this, each storage platter comprises a positioning cam 98 projecting towards the outside of the rotatable assembly when the platter is in the storage position and these cams cooperate with fixed rods 99 or like abutments disposed vertically at chosen locations outside the rotatable assembly. These rods are parallel to the columns of platters and cooperate with the positioning cams when the rotatable assembly rotates.

According to one advantageous feature of the invention the extraction of a platter from its column or its reinsertion are commanded by limited rotation movements (through a predetermined angle) of said rotatable assembly after the rack 65 has been brought into engagement with the toothed sector of the selected platter. In other words, a platter is extracted by operating the motor 30 of the rotatable assembly so as to displace it through a predetermined angle and the reinsertion of the platter into its column is effected in an analogous way by rotation of the rotatable assembly in the opposite direction. The control signal is generated by the aforementioned first sensing means 74. The identifying ribs 72 all have the same predetermined width in corresponding relationship to this predetermined angle of rotation of the rotatable assembly.

Finally, note that the transfer system 12 is advantageously associated with a free support 101 sliding along two parallel rods 40 and 41 over the transfer system 12. This support is not actively driven and simply tracks displacements of the transfer system. It comprises an arm 102 to the end of which is fixed a rigid baseplate 103 which is adapted to support a storage platter extracted from its column and prevent it bending excessively when the disk is grasped. The baseplate 103 therefore comprises an edge adapted to come into contact with the lower surface of the edge of the platter opposite its pivot axis. Also, the arm 102 is provided with a pin 104 adapted to bear against the storage platter, more particularly against the flat arm 52 thereof, which temporarily immobilizes said free support 101 when the transfer system is lowered to grasp the disk on the storage platter. During this operation flexing of said storing platter is limited by the presence of said free support.

The operation of the device that has just been described is obvious from the foregoing description. During an initial phase the various platters are loaded through the intermediary of the above-mentioned manual drawer which presents the disks one by one to the handling means of the transfer system. This places the disks successively into programmed locations on the various storage platters. When all of the disk collection has been stored in the device in this way and the locations of the disks have been memorized appropriately by a computer-based management system that is no part of the invention, a disk is selected and fed to the player 13a or 13b in the following manner. The rotatable assembly 16 is rotated until the column of storage platters C1-C4 containing the selected disk is at a predetermined location adjoining the transfer system 12. This movement is stopped when said first sensing means 74 are facing the vertical edge of the stack of identifying ribs 72. Then, starting from its memorized position, the transfer system 12 moves vertically upwards or downwards, still under the control of the first sensing means 74, until it reaches a height appropriate to the storage platter 11 carrying the chosen disk. From this time the rack 65 is operated so as to come into engagement with the toothed sector of this storage platter. Still under the control of said first sensing means 74, the rotatable assembly 16 is moved through a predetermined angle defined by the displacement of the rib 72 facing the sensing means 74. This results in the extraction of said storage platter until the finger 84 on the platter enters the U-shape cell 85a. The transfer system 12 is then lowered at the same time as the coil 39 is energized until the finger 84 reaches the cell 85b. At this time the coil is de-energized which causes the disk to be grasped and the transfer system 12 is raised (by the motor 48) until the finger 84 reaches the cell 85a. The predetermined reverse rotation of the rotatable assembly is then commanded, which returns the storage platter into its column. The rack 65 is then disengaged. The transfer system 12 is lowered to the height of the drawer 14 in which it places the disk by simple momentary actuation of the coil 39. Of course, all the operations that have just been mentioned are managed by a microprocessor-based control system whose design will be obvious to the man skilled in the art and which does not form any part of the invention.

I claim:

1. Device for storing and reading flat data media such as disks read by a laser beam, comprising in combination:
    at least one column of storage platters for said data media stacked one on the other and mounted to be mobile in their respective planes between a storage position and a transfer position;
    a transfer system mounted to be mobile parallel to said column and comprising means for handling a data medium;
    means for selecting a data medium and moving the relevant storage platter into the transfer position facing said handling means;
    at least one player having a loading part adapted to be placed facing a predetermined position of said transfer system to receive a data medium;
    at least one first support column extending parallel to said column of storage platters for supporting said storage platters, said first support column having spacer means for maintaining a substantially constant gap between said storage platters, each of said storage platters having a flat arm articulated to said first support column; and
    at least one second support column extending parallel to said column of storage platters and comprising separators between which storage platters are respectively inserted, said separators holding and providing vertical support for said storage platters when said storage platters are in the storage position.

2. Device according to claim 1 wherein said just support column is formed by a rigid stack of just spacer members each comprising a pivot shaft section and wherein each arm comprises a cylindrical hole of matching diameter whereby it is mounted to rotate about said shaft section.

3. Device according to claim 2 wherein said selector means comprise a toothed sector defined at the end of each flat arm coaxially with said cylindrical hole whereby said platter is rotatably mounted on said support column.

4. Device according to claim 3 wherein said transfer system carries retractable meshing means adapted to cooperate with said toothed sector of said storage platter of a selected data medium.

5. Device according to claim 2 wherein said selector means comprise a set of identifying ribs of said rigid stack of members of said first support column and first sensing means carried by said transfer system and cooperating with said ribs to position said transfer system relative to a selected data medium platter.

6. Device according to claim 1 wherein each flat arm of a storage platter comprises a leaf spring inserted between two spacer members and provided with a peg at its end adapted to cooperate with bosses carried by one of said two spacer members to stabilize the extreme positions of said storage platter.

7. Device according to claim 1 wherein each storage platter comprises an outwardly projecting finger adapted to cooperate with second sensing means carried by said transfer system to monitor displacement of the latter during maneuvers of grasping a chosen, data medium.

8. Device according to claim 1 wherein each storage platter comprises a positioning hole adapted to cooperate with a spindle carried by said transfer system.

9. Device according to claim 1 wherein a plurality of columns of storage platters are arranged on a rotatable assembly adapted to rotate about a central shaft parallel to said columns and wherein drive means are coupled to said rotatable assembly.

10. Device according to claim 9 wherein each storage platter comprises a positioning cam projecting towards the exterior of said rotatable assembly when said platter is in the storage position and abutment means are disposed at chosen locations outside said rotatable assembly and parallel to said columns of storage platters to cooperate with said positioning cams during rotation of said rotatable assembly to align said platters in their respective columns.

11. Device according to claim 9 wherein said transfer system carries retractable meshing means adapted to cooperate with a toothed sector of said storage platter of a selected data medium and said meshing means form a rack mounted to pivot towards said storage platters and actuated by an electric motor through the intermediary of a cam.

12. Device according to claim 9 wherein said transfer system carries retractable meshing means adapted to cooperate with a toothed sector of said storage platter of a selected data medium and said drive means of said rotatable assembly are adapted to rotate it through a predetermined angle when said meshing means are engaged with the toothed sector of a storage platter.

13. Device according to claim 12 wherein said selector means comprise a set of identifying ribs of said rigid stack of members of said just support column and first sensing means carried by said transfer system and cooperating with said ribs to position said transfer system relative to a selected data medium platter and said identifying ribs have the same predetermined width in corresponding relationship to the aforementioned predetermined angle of rotation, said drive means of said rotatable assembly being controlled by first sensing means to cause displacement through a predetermined angle.

14. Device according to claim 1 wherein said transfer system comprises an arm at the end of which is a deformable core adapted to be inserted into a hole in said data medium, the shape of said core being modified by the action of control means such as a solenoid so as to be able to grasp said data medium.

15. Device according to claim 1 wherein said transfer system slides between two parallel rods and comprises a threaded nut prevented from rotating meshing with a threaded rod driven in rotation to move said transfer system.

16. Device according to claim 15 further comprising a free support sliding along said two parallel rods and driven by displacement of said transfer system and comprising a pin adapted to bear against a storage platter extracted from its column and a baseplate adapted to support said platter at the end opposite its pivot axis in the edge region thereof outside said data medium.

17. Device for storing and reading flat data media such as disks read by a laser beam, comprising in combination:
   at least one column of storage platters for said data media stacked one on the other and mounted to be mobile in their respective planes between a storage position and a transfer position;
   a transfer system mounted to be mobile parallel to said column and comprising means for handling a data medium;
   means for selecting a data medium and moving the relevant storage platter into the transfer position facing said handling means;
   at least one player having a loading part for facing a predetermined position of said transfer system to receive a data medium;
   at least one first support column extending parallel to said column of storage platters for supporting said storage platters, said first support column having spacer means for maintaining a substantially constant gap between said storage platters, each of said storage platters having a flat arm articulated to said first support column; and
   at least one second support column extending parallel to said column of storage platters and comprising separators between which storage platters are respectively inserted to be supported and held by said separators when said storage platters are in the storage position, wherein the edge of each storage platter comprises a thin rib comprising at least one helical section ending in a bearing area in which said platter bears on the respective separator.

18. Device according to claim 17 wherein the edge of each storage platter comprises a thickened rib defined in the vicinity of the bearing area.

19. Device for storing and reading flat data media such as disks read by a laser beam, comprising in combination:
   a plurality of columns of storage platters for said data media arranged on a rotatable assembly which is rotatable about a central shaft parallel to said columns of storage platters and drive means coupled to said rotatable assembly, storage platters in each of said columns being stacked one on the other and mounted to be mobile in their respective planes between a storage position and a transfer position;
   a transfer system mounted to be mobile parallel to said column and comprising means for handling a data medium;
   means for selecting a data medium and moving the relevant storage platter into the transfer position facing said handling means;
   at least one player having a loading part for facing a predetermined position of said transfer system to receive a data medium;
   at least one first support column extending parallel to said column of storage platters for supporting said storage platters, said first support column having spacer means for maintaining a substantially constant gap between said storage platters, each of said storage platters having a flat arm articulated to said first support column; and
   at least one second support column extending parallel to said column of storage platters and comprising separators between which storage platters are respectively inserted to be supported and held by said separators when said storage platters are in the storage position,
   wherein said at least one first support column comprises a plurality of first support columns and said at least one second support column comprises a plurality of second support columns, each of said columns of storage platters is associated with a respective first support column and a respective second support column, said columns of storage platters adjoin one another, and each said first support column forms a structural unit with a respective second support column such that in each structural unit said first and second support column support respective ones of adjoining columns of storage platters.

20. Device according to claim 19 wherein each support column is formed by a rigid stack of just spacer members each comprising a pivot shaft section and a protuberance constituting a separator of said other support column.

* * * * *